3,085,015
PROCESS FOR MAKING OIL CONTAINING
COMPOSITIONS
Cornelius John Schram, Bedford, England, assignor to Lever Brothers Company, New York, N.Y., a corporation of Maine
No Drawing. Filed Nov. 27, 1959, Ser. No. 855,539
8 Claims. (Cl. 99—118)

This invention relates to novel compositions, in particular solid compositions containing a major proportion of oil, and a method of making them.

The present application is a continuation-in-part of copending application, Serial No. 582,340, filed May 3, 1956, now abandoned.

In this specification, "oil" means any animal, vegetable or mineral oil, fat, grease or wax, and includes such substances as petroleum jelly. The invention is of particular importance, however, when applied to edible animal or vegetable oils or fats such as the mono-, di- or tri-glycerides.

According to the invention, the solid composition containing a major proportion of an oil is obtained by first preparing an aqueous emulsion containing a water-soluble polyuronide and the oil and then converting the emulsion into a solid by introducing the emulsion into a precipitating bath.

The solids may be obtained as sheets, ribbons or filaments, usually by extruding an alginate or pectate containing emulsion into a precipitating solution. The solids may also be obtained as globules, free-flowing powders or other granular solids by spraying the emulsion into a precipitating solution.

Whether the oil or oil mixture be liquid, pasty or solid at ordinary temperatures, the solid composition containing it has a little or no oily or fatty feel, little or no tendency to exude the oil on storage and a higher melting point than the oil or oils contained in it. The invention makes it possible to obtain solid compositions with a high oil content that is more than 85%, which have these properties and will not attain a greasy feel too readily under mechanical stress. Filaments have been made according to this invention containing over 85% of a liquid oil which remain dry to the touch at temperatures as high as 150° C. Proportions as high as 95% may be obtained and, since for edible purposes, at any rate, a very high oil content will frequently be desirable, an oil content of 90–95% is preferred. Thus the invention provides a means of obtaining, for instance, a free-flowing powder containing as much as 90–95% of an edible oil such as groundnut oil. These products are dry to the touch and heat stable.

The polyuronides comprise a group of substances known as polygalacturonates such as alginates, pectates and vegetable gums. Examples of the latter are gum tragacanth and gum acacia.

The aqueous emulsion is preferably prepared by first dissolving the requisite amount of a readily water-soluble polyuronide such as an alginate in water. Alternatively, a dispersion of the gum in water may first be prepared. An emulsifying agent, if desired in solution, is usually added at this stage and the mixture agitated sufficiently to produce a uniform solution. Finally, the oil is added and the mixture again agitated so as to obtain the required emulsion. The ingredients may be mixed and agitated under reduced pressure to reduce aeration of the emulsion. Elevated temperatures may be used, particularly when a solid oil or one of the less readily soluble polyuronides, such as a gum, is used.

The emulsion should be as uniform as possible and, where it is to be sprayed, the oil globules should be small in relation to the size of the droplets produced on spraying. A mean globular diameter of the oil of 1–2 microns is aimed at for spraying. The volume ratio of aqueous phase to oily phase is also important when spraying and it is advisable to have a ratio of at leas 4:1. Below this ratio the emulsion tends to be too viscous for proper atomization and the emulsion tends to invert during drying. A ratio of about 6:1 is very satisfactory.

An emulsifying agent must usually be present if an emulsion of the required uniformity and stability is to be obtained. Any emulsifying agent capable of giving such an emulsion with the particular oil or polyuronide used, may be employed. Preferred emulsifying agents are cellulose derivatives, such as methyl ethyl cellulose, and monoglycerides, such as glyceryl monostearate.

The amount of emulsifying agent also varies with the other substances used and, particularly, with the oil proportion. 2% or less is usually sufficient below 90% oil. At or above 90% the preferred amount of emulsifying agent used equals that of polyuronide.

The precipitating bath or solution used according to this invention may include a strongly hydrophilic liquid which serves to dehydrate the emulsion. Such dehydrating liquids should not dissolve substantial quantities the oil or polyuronide. Examples of such liquids include ethyl alcohol, methyl alcohol, isopropanol and tertiary butanol. Ethyl alcohol is preferred because of its superior affinity for water. Absolute ethyl alcohol is the most effective, but its use generally adds to the expense of the procedure. Industrial ethyl alcohol is completely satisfactory.

After the emulsion has been converted to a solid in the dehydrating liquid, the solid material is separated and the residual traces of dehydrating liquid are removed by appropriate means. The resulting product contains polyuronides in a water-dispersible or water-soluble form.

A second type of precipitating bath which may be employed according to this invention is exemplified by aqueous solutions containing alkaline earth metal ions. These solutions convert the polyuronide to water-insoluble salts or to salts which are not readily dispersible in water. One example of this type of precipitating bath is the use of calcium chloride solutions for precipitating emulsions containing sodium alginate. Solutions containing magnesium ions are equally effective.

By following this procedure, a solid product is obtained by precipitation which, after removal from the precipitating bath, must be dried to remove residual water. The product is not readily dispersible in water. This procedure can be used to make a product resembling natural body fat.

All percentages in this specification are percent by weight and are given with reference to the dry weight of the final composition.

*Example 1*

10 gms. of sodium alginate were dissolved in 250 mls. substantially calcium free water in a high speed macerator. 100 gms. of a vegetable fat having a melting point of 29° C. were liquefied by heating to 60° C. and 5 gms. glyceryl monostearate were then added to the fat with stirring. The hot solution of glyceryl monostearate in fat so produced was poured slowly into the alginate solution whilst agitating vigorously. When all the solution had been added, agitation was continued at 60° C. until the particles of the dispersed phase were no more than 10 microns in diameter. The emulsion was then passed through a centrifuge to remove air bubbles. It was then extruded through a spinneret having holes 90 microns in diameter into a 6% aqueous calcium chloride solution at room temperature.

A portion of the filaments so obtained was washed with water, dried in warm air and then chopped to give a powder. Another portion of the filaments was suspended in a 1% aqueous calcium chloride solution and the filaments were then broken up and the resultant cake washed with water, rinsed with ethyl alcohol and then dried in warm air.

No appreciable amount of fat was lost in the precipitating bath or during drying. Ether extraction of the dry filaments or the dry powders gave an almost quantitative yield of the fat solution incorporated in the emulsion.

*Example 2*

Instead of using a solid fat, as in Example 1, groundnut oil was used, the rest of the procedure being the same as in Example 1.

*Example 3*

10 gms. of apple pectin were dissolved, a little at a time, in 250 mls. of substantially calcium free water in a high speed macerator. After each addition of pectin, a few drops of a 10% solution of sodium hydroxide were added to inhibit gelling. When all the pectin had been dissolved, the solution was aged for approximately two hours during which time a few more drops of alkali were added. 10 mls. of a 5% solution of methyl ethyl cellulose were then added. The pH of the resultant solution was 3.6. 90 gms. of groundnut oil were then slowly poured into the solution whilst agitating vigorously. When all the oil had been added, the emulsion was homogenized in the macerator for a few minutes and then centrifuged to remove air bubbles.

One portion of the emulsion was extruded through a spinneret having holes 90 microns in diameter into a 6% aqueous calcium chloride solution at room temperature. The filaments were washed with water and dried in warm air. They contained 90% groundnut oil.

Another portion of the emulsion was extruded through a similar spinneret into ethyl alcohol. After removal from the precipitating bath, the filaments so obtained were exposed to warm air to remove residual alcohol. The resultant filaments had a similar appearance to those obtained by calcium chloride precipitation. The alcohol precipitated filaments, however, melted in the mouth with complete liberation of the oil.

It is understood that the foregoing examples are illustrative only and that modifications will occur to those skilled in the art. Therefore, the invention is not to be limited thereto but is to be defined by the appended claims.

I claim:
1. A process of preparing a solid composition containing a major proportion of an oil selected from the group consisting of animal, vegetable and mineral oils, fats, greases and waxes, said composition being in a form selected from the class consisting of filaments, ribbons and sheets, the said process comprising forming an aqueous emulsion which, apart from water and dispersing agent, consists essentially of an oil and a water-dispersible polyuronide, the oil being present in a greater proportion than the polyuronide, extruding said emulsion into a precipitating bath for the polyuronide to form the product of said class, and drying said product to remove solvents, including residual water remaining therein, whereby a substantially dehydrated product of said class is obtained.

2. The process of claim 1 in which the polyuronide is a water-dispersible alginate.

3. The process of claim 1 in which the oil content of the emulsion is more than 85% by weight of the total solids present.

4. The process of claim 1 in which the oil content of the emulsion is 90–95% by weight of the total solids present.

5. The process of claim 1 in which the precipitating bath is an aqueous solution containing alkaline earth metal ions.

6. The process of claim 1 in which the precipitating bath is an aqueous calcium chloride solution.

7. The process of claim 1 in which the precipitating bath is a dehydrating liquid.

8. The process of claim 1 in which the precipitating bath is ethyl alcohol.

References Cited in the file of this patent

UNITED STATES PATENTS

| | | |
|---|---|---|
| 2,392,995 | North et al. | Jan. 15, 1946 |
| 2,786,764 | Rivoche | Mar. 26, 1957 |
| 2,800,457 | Green et al. | July 23, 1957 |
| 2,800,458 | Green | July 23, 1957 |

FOREIGN PATENTS

| | | |
|---|---|---|
| 221,466 | Great Britain | Feb. 27, 1924 |

OTHER REFERENCES

"The Pectic Substances," by Kertesz, Interscience Publishers, Inc., New York, 1951, pp. 112, 453 and 454.